United States Patent [19]
Nakano et al.

[11] Patent Number: 6,086,492
[45] Date of Patent: Jul. 11, 2000

[54] ENGINE BRAKE FOR OFFROAD VEHICLE

[75] Inventors: Takatoshi Nakano; Seiji Nakagaki, both of Iwata, Japan

[73] Assignee: Yamaha Hatsudoki Kabushiki Kaisha, Shizuoka, Japan

[21] Appl. No.: 09/097,377

[22] Filed: Jun. 15, 1998

[30] Foreign Application Priority Data

Jun. 13, 1997 [JP] Japan .................................. 9-172838

[51] Int. Cl.⁷ .................................................. B60K 17/06
[52] U.S. Cl. .................................. 474/16; 474/14; 477/44
[58] Field of Search ..................... 477/44–48; 474/14–16

[56] References Cited

U.S. PATENT DOCUMENTS

| 3,017,783 | 1/1962 | Brugghen et al. | 474/16 X |
| 3,653,283 | 4/1972 | Betz | 477/46 |
| 4,206,659 | 6/1980 | Rijsdijk | 477/44 X |

Primary Examiner—Khoi Q. Ta
Attorney, Agent, or Firm—Knobbe, Martens, Olson & Bear, LLP

[57] ABSTRACT

An engine brake for a vehicle having a frame rollably supported by at least one wheel, an engine supported by the frame and having an output shaft, the output shaft arranged to drive at least one wheel supporting the vehicle through a transmission, is disclosed. The transmission has a drive pulley driven by the output shaft and a driven pulley driven by the drive pulley. The drive pulley comprises a fixed sheave and a moveable sheave moveable relative to the fixed sheave. The moveable sheave in a first position relative to the fixed sheave causes the drive pulley to drive the driven pulley in a high speed position and the moveable sheave in a second position relative to the fixed sheave causing the drive pulley to drive the driven pulley in a low speed position. The engine brake comprises an air chamber defined in part by the moveable sheave and a vacuum apparatus removing air from the chamber and moving the moveable sheave to its second position when a speed of the engine is reduced.

31 Claims, 4 Drawing Sheets

ENGINE BRAKE FOR OFFROAD VEHICLE

FIELD OF THE INVENTION

The present invention relates to an offroad vehicle. More particularly, the invention is an engine brake for such an offroad vehicle.

BACKGROUND OF THE INVENTION

Offroad vehicles or "ATVs" as they are commonly referred to are designed to be operated over rugged terrain. These vehicles are often operated on steep inclines and declines, on rough roads, and in mud and water.

These vehicles include a frame supported by wheels. In one common arrangement, the vehicle has four wheels. An internal combustion engine is used to power at least one, and most commonly all, of the wheels.

In this arrangement, a first drive shaft extends to a front axle and a second drive shaft extends to a rear axle. The first and second drive shafts are driven by a crankshaft of the engine. The vehicle includes a transmission through which the first and second drive shafts are powered by the crankshaft. In one arrangement, the transmission is a variable speed type transmission having a belt which is driven by one pulley and which drives another pulley.

For a number of reasons, including safety, it is desirable for the offroad vehicle to include an engine braking feature. In this manner, when the rider indicates a desire to slow the vehicle by releasing the throttle, the engine is used to slow the rotation of the drive shafts, and thus the wheels.

It is an object of the present invention to provide an offroad vehicle with an engine braking system which is compact, simple and efficient in operation.

SUMMARY OF THE INVENTION

The present invention is an engine brake for a vehicle. Preferably, the vehicle is of the type having a frame rollably supported by at least one wheel. An engine is supported by the frame and has an output shaft. The output shaft is arranged to drive at least one wheel supporting the vehicle through a transmission.

The transmission has a drive pulley driven by the output shaft and a driven pulley driven by the drive pulley. The drive pulley comprises a fixed sheave and a moveable sheave moveable relative to the fixed sheave. The moveable sheave in a first position relative to the fixed sheave causes the drive pulley to drive the driven pulley in a high speed position and the moveable sheave in a second position relative to the fixed sheave causing the drive pulley to drive the driven pulley in a low speed position.

The engine brake comprises an air chamber defined in part by the moveable sheave and a vacuum apparatus removing air from the chamber and moving the moveable sheave to its second position when a speed of the engine is reduced.

Further objects, features, and advantages of the present invention over the prior art will become apparent from the detailed description of the drawings which follows, when considered with the attached figures.

DETAILED DESCRIPTION OF THE PREFERRED EMBODIMENTS OF THE INVENTION

Figure 1:
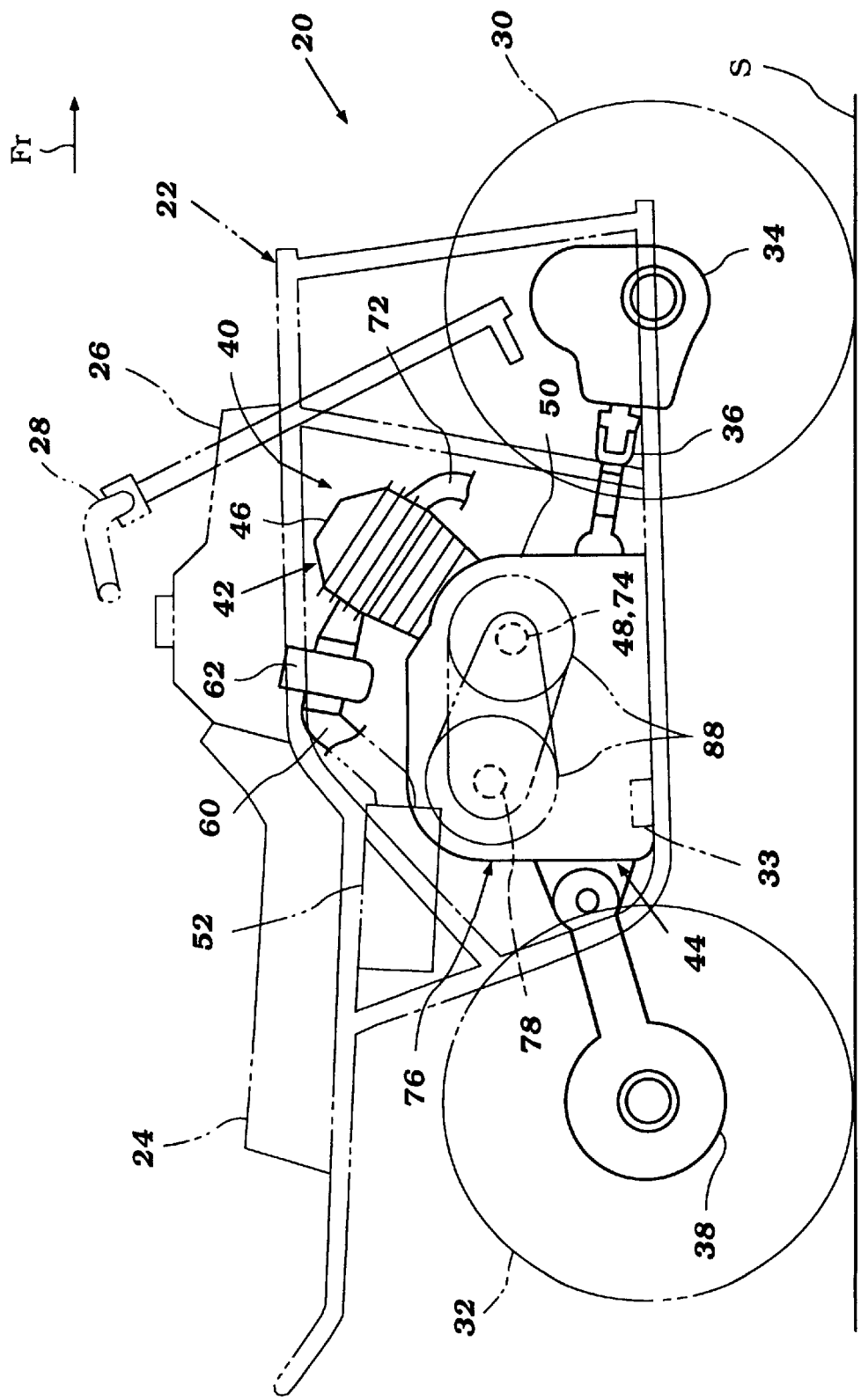
FIG. 1 is a side view of an offroad vehicle powered by an engine and having an engine brake in accordance with the present invention.

The present invention is an engine brake for vehicle 20. Referring to FIG. 1, the vehicle 20 comprises an all-terrain vehicle or "ATV." While the engine brake of the present invention is described with this particular type of vehicle, those of skill in the art will appreciate that the invention may have utility in a wide range of applications.

The vehicle 20 has a tubular, open type frame 22. The frame 22 may have a wide variety of constructions as known to those of skill in the art, and thus is not described in detail herein. The frame 22 may be constructed of metal struts or tubes which are connected by welding or other means well known in the art.

A seat 24 is supported by the frame 22. The seat 24 is positioned to the rear of a fuel tank 26 which is also supported by the frame 22, but close to a steering handle 28 positioned to the front of the fuel tank 26.

The-steering handle 28 is coupled to an appropriate steering mechanism for steering a pair of front wheels 30 (the front end of the vehicle faces in the direction Fr in the figures). Referring to FIG. 1, the frame 22 is rollably supported on a support surface S, such as the ground, by the pair of front wheels 30 and a pair of rear wheels 32.

A foot step or peg 33 is preferably positioned on each side of the vehicle 20 and supported by the frame 22. These pegs 33 are arranged to support a rider's feet some distance above the support surface S during operation of the vehicle 20.

Each front wheel 30 is mounted to a front axle (not shown) extending from a front differential 34, permitting individual movement of the wheels 30 with respect to one another. The front differential 34 is arranged to transmit power from a front drive shaft 36 to each of the front axles.

Each front wheel 30 is mounted for movement up and down with respect to the frame 22. A shock, strut or similar energy absorbing member is preferably provided between the frame 22 and the supporting structure for each front wheel 30. The shocks 66 are arranged to dampen the upward and downward movement of the wheel 30, as well known to those of skill in the art.

The rear wheels 32 are mounted at opposing ends of an axle and are also mounted for vertical movement with respect to the frame 22. In this regard, at least one shock is provided between the frame the axle. Because the rear axle is movably mounted to the frame 22, the drive mechanism for the rear wheels 32 is pivotally mounted. As illustrated, a rear differential or gear box 38 is supported by the axle and a rear trailing arm.

A drive unit 40 is provided for driving the front and rear wheels 30, 32. Preferably, this drive unit 40 includes an engine 42 having an output shaft arranged to drive the wheels 30, 32 through a transmission 44.

The engine 42 is preferably of the internal combustion type, having a single cylinder 46 and operating on a four-cycle principle. Those of skill in the art will appreciate that the engine 42 may have more than one cylinder and operate in accordance with other cycles, such as a two-cycle principle.

The engine 42 has a body which defines the cylinder 46. A piston (not shown) is movably mounted in the cylinder 46. A top end of the piston cooperates with the cylinder 46 to define a combustion chamber. The piston is connected via a connecting rod (not shown) to a crankshaft 48.

The crankshaft 48 is mounted for rotation within a crankcase 50 positioned at a bottom end of the engine 42. The engine 42 is oriented such that the crankshaft 48 extends generally perpendicular to an axis extending through the vehicle 20 from the front end to the rear end.

Figure 2:
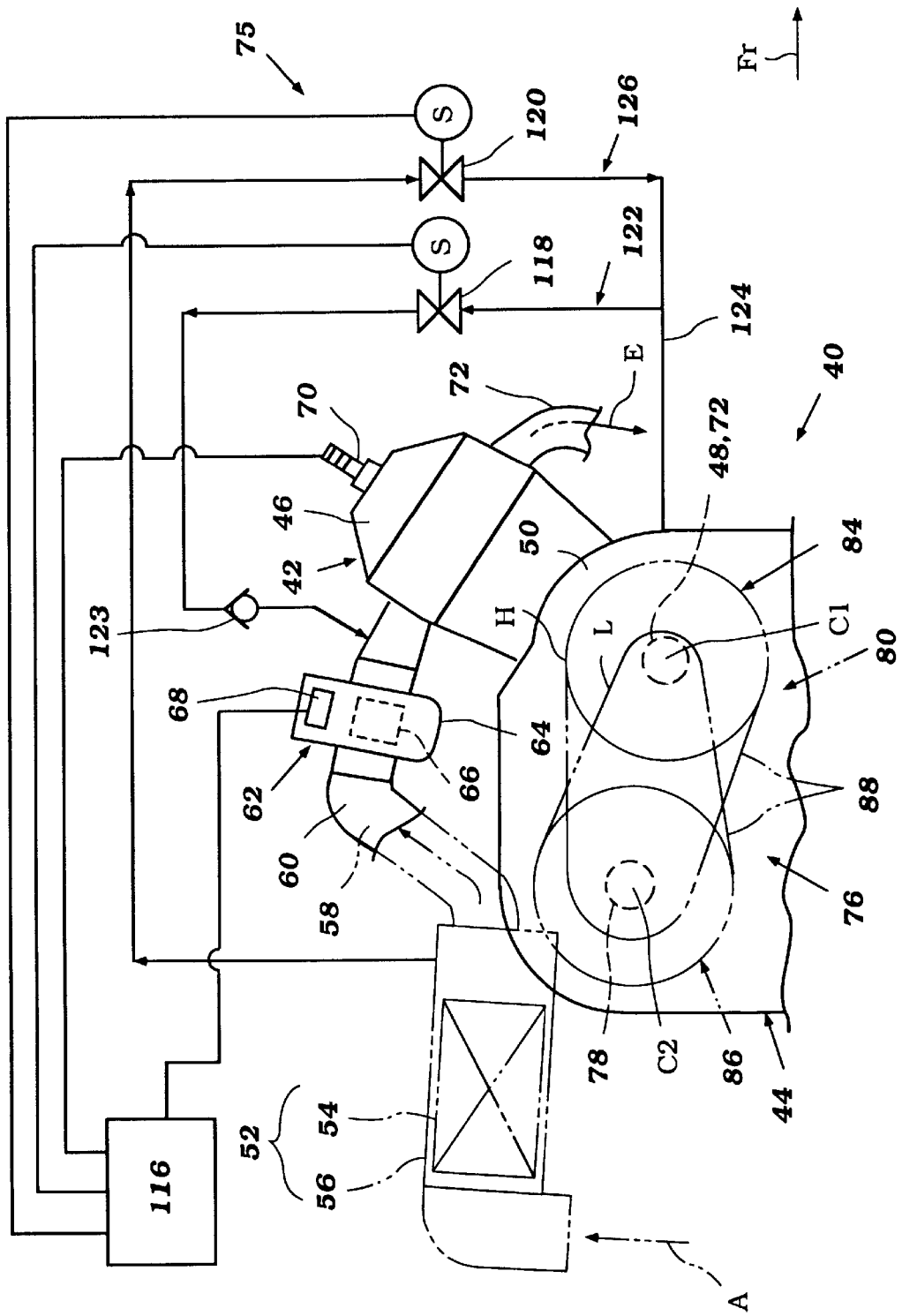
FIG. 2 is a schematic illustrating control apparatus associated with the engine brake of the present invention, including an engine and transmission of the offroad vehicle illustrated in FIG. 1 in side view.

Referring primarily to FIG. 2, air is supplied to the cylinder 46 for combustion through a suitable intake system. Air A is drawn through an intake duct into an air box or cleaner 52 positioned below the seat 24. The air cleaner 52 preferably comprises a filter element 54 positioned in a casing 56.

Air is routed from the air cleaner 52 to the engine 42 through an intake passage 58 defined by an intake pipe 60. Preferably, fuel is added to the air passing through the intake system. As illustrated, a carburetor 62 is positioned along the intake pipe 60 between the engine 42 and air cleaner 52.

Fuel is supplied to the carburetor 62 from the fuel supply by a fuel system of a type well known to those of skill in the art. The manner by which carburetors operate and their construction is well known in the art. Those of skill in the art will also appreciate that the fuel may be injected with a fuel injector, either directly or indirectly.

The carburetor 62 preferably has a body 64 which defines a passage through which the air passes. A throttle valve 66 is mounted in this passage for movement between an open position and a closed position. The throttle valve 66 is preferably controlled by a throttle control mounted at or near the steering handle 28, whereby the rider of the vehicle 20 may control the flow rate of air to the engine 42.

A throttle position sensor 68 is provided for monitoring the position of the throttle valve 66, as described in more detail below.

The combined air and fuel mixture is supplied to the combustion chamber portion of the cylinder 46. One or more valves or other mechanisms may be provided for controlling the flow of the air and fuel into the cylinder 46 in a timed manner, as well known to those of skill in the art.

A suitable ignition system is provided for igniting the air and fuel mixture which is supplied to the cylinder 46. This ignition system includes a spark plug 70 having its electrode positioned in the combustion chamber and means for providing an electric charge to the spark plug 70.

The products of combustion are selectively routed from the cylinder 46 through an exhaust port. The timing of the flow of exhaust may be controlled by a valve or similar mechanism as well known to those of skill in the art. Exhaust E which flows through the port flows into an exhaust pipe 72 which leads to a suitable discharge to the atmosphere.

As is well known, the movement of the piston as caused by the combustion of the fuel in the cylinder 46 turns the crankshaft 48. The motion of the crankshaft 48 is used to drive the front and rear wheels 30, 32 through the transmission 44 in a manner described below.

The transmission 44 includes a transmission casing 76 which defines an internal chamber containing transmission elements. With reference to FIGS. 1 and 2, the transmission 44 will be described generally.

The crankshaft 48 is arranged to drive a primary shaft 74 of the transmission 44. As illustrated, the crankshaft 48 and primary shaft 74 both rotate about an axis C1 which is transverse to a longitudinal axis through the front to the rear of the vehicle 20.

The primary shaft 74 is arranged to drive a drive shaft 78. The drive shaft 78 is arranged to rotate about an axis C2 which is parallel to, but offset from the axis C1 about which the primary shaft 74 rotates.

The primary shaft 74 rotates the drive shaft 78 through a drive mechanism 80. In the preferred arrangement, this mechanism 80 is a belt drive. As illustrated, a drive pulley 82 is connected to the primary shaft 74. A driven pulley 84 is connected to the drive shaft 86. A "V"-belt 88 or other suitable flexible transmitter is arranged to be driven by the drive pulley 82 and drives the driven pulley 86.

Although not illustrated, the drive shaft 78 is then arranged to drive the front drive shaft 36 and rear drive shaft (not shown) which extend perpendicular to the axes C1 and C2 and which extend to the front and rear differentials 34, 38, respectively, for driving the front and rear wheels 30, 32. The mechanism by which the drive shaft 78 is arranged to drive these front and rear drive shafts may be provided with a countergear or similar device for selectively driving the front and rear wheels 30, 32 in a reverse direction as well as a forward direction.

The arrangement of the transmission 44 will be described in more detail now with reference to FIG. 3. As illustrated, the transmission case 76 is defined in part by a crankcase housing 51 defining the crankcase 50, a main housing element 90, and a transmission cover 92. The cover 92 is preferably removably connected to the main housing element 90 at the side thereof facing outwardly of the vehicle 20, so that when removed the interior of the transmission 44 is accessible.

As illustrated, a first end 94 of the primary shaft 74 is connected to the crankshaft 48 and is driven thereby. An opposing second end 96 of the primary shaft 74 is rotatably supported by the transmission cover 92 with a bearing 98.

The drive pulley 82 comprises fixed sheave 100 mounted on the primary shaft 74 in a fixed position and a moveable sheave 102 slidably mounted on the primary shaft 74. A "V"-shaped groove 104 is defined between the fixed and moveable sheaves 100, 102 in which the "V"-belt 88 is positioned.

The driven pulley 86 similar comprises a fixed sheave 106 mounted to the drive shaft 78 in a fixed position and a moveable sheave 108 slidably mounted on the drive shaft 78. A "V"-shaped groove 110 is defined between the fixed and moveable sheaves 106, 108 in which the "V"-belt 88 is positioned.

Means are provided for moving the moveable sheaves 102, 108 with respect to their corresponding fixed sheaves 100, 106 for changing the position of the "V"-belt 88 and thus the drive ratio of the transmission.

Preferably, this means includes a centrifugal weight 112 associated with the drive pulley 82. As illustrated, a backup plate 114 is mounted on the primary shaft 74 on a side of the moveable sheave 102 opposite the fixed sheave 100. This plate 114 is connected to the primary shaft 74 so as to be rotated therewith.

The centrifugal weight 112 comprises a metal sphere which is positioned between the backup plate 114 and the moveable sheave 102. The weight 112 is sandwiched between a portion of the backup plate 114 which extends or slopes in the direction of the moveable sheave 102 and a surface of the sheave 102 which correspondingly curves towards the plate 114. In other words, the moveable sheave 102 and plate 114 are positioned closer to one another moving in a direction radially outward from the axis C1.

Figure 3:
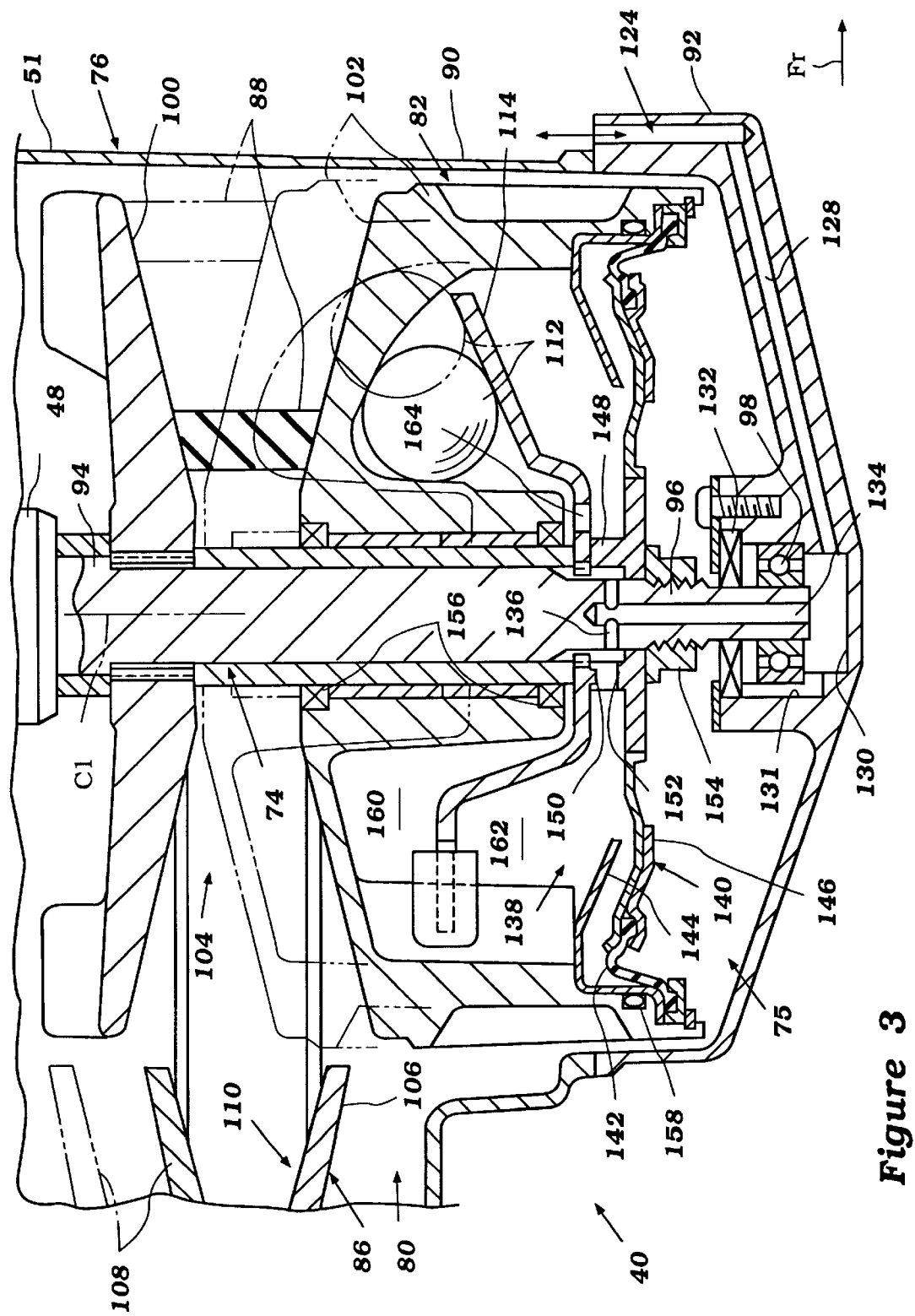
FIG. 3 is a partial cross-sectional view of the transmission of the offroad vehicle illustrated in FIG. 1.

In this arrangement, when the engine speed, and thus the speed of the primary shaft 74, is low, then the tension on the "V"-belt 88 forces the moveable sheave 102 away from the fixed sheave 100 into the position illustrated in solid lines in FIG. 3 (and position "L" in FIG. 2). On the other hand, as the speed of the primary shaft 74 increases, the weight 112 moves outwardly towards the position illustrated in dotted lines in FIG. 3. In this position, the weight 112 forces the moveable sheave 102 towards the fixed sheave 100, narrowing the groove 104, and forcing the "V"-belt 88 radially outwardly into the position illustrated in dotted lines in FIG. 3 (and position "H" in FIG. 2).

A similar mechanism is associated with the driven pulley 86, although not illustrated. For example, a spring may be arranged to press the moveable sheave 108 on the drive shaft 78 inwardly towards the fixed sheave 106 at a low speed (i.e. moving the belt 88 into the position "L" in FIG. 2). When the tension becomes high on the "V"-belt 88, this spring force is overcome and the belt moves radially inwardly, spreading the moveable sheave 108 away from the fixed sheave 106 into the position "H" illustrated in FIG. 2.

When in the low speed position "L", the speed at which the drive shaft 78 rotates is less than the speed at which the primary shaft 74 rotates, providing good torque and low drive speed. On the other hand, as the speed of the engine increases (as governed by the rider's control of the throttle) and the belt 88 moves to the high speed position "H" the drive shaft 78 is driven at a higher speed than the primary shaft 74 rotates.

In accordance with the present invention, an engine brake is provided. The engine brake comprises an engine braking system 75 arranged so that when the rider of the vehicle 20 moves the throttle valve 66 towards a closed position the reduction in engine speed is utilized to reduce the speed of the vehicle 20.

In general, the engine braking system 75 includes a vacuum chamber 138 associated with the moveable sheave 102 on the primary shaft 74 and a vacuum apparatus for evacuating the chamber 138 and causing the moveable sheave 102 to move towards its low speed position.

Referring to FIG. 2, the engine braking system 75 includes a control unit 116. The control unit 116 is arranged to receive throttle valve position information from the throttle position sensor 68. The control unit 116 is arranged to control the position of a first valve 118 and a second valve 120 associated with the engine braking system 75.

The first valve 118 is positioned along a low pressure air line or vacuum passage 122 extending between the intake passage 58 and a main passage 124. More particularly, the low pressure air line 122 extends from a portion of the intake passage 58 which is preferably downstream of the venturi through the carburetor 62. The low pressure line 122 is so called because its connection to the low pressure area of the intake passage 58 causes air to be drawn therethrough in the direction of the intake passage.

As illustrated, a check valve 123 or other one-way type valve is preferably positioned along the line 122 between the first valve 118 and the intake passage 58. This check valve 123 is arranged to prevent the reverse flow of air towards the intake passage 58.

The second valve 120 is positioned along an atmospheric air line or passage 126 extending between the air cleaner 52 and the main passage 124. The atmospheric air line 126 is so called because it is connected to a near atmospheric air source. In this regard, the line 126 may be lead to other than the air cleaner 52, as long as its terminus is at an air source which is at atmospheric pressure. The connection of the line 126 to the air cleaner 52 serves to reduce the chance that particulate and debris may clog the line.

Referring to FIG. 3, the main passage 124 is at least partially defined by the transmission cover 92 and extends to a connecting passage 128 defined by the cover. This connecting passage 128 terminates at a chamber 130 defined partly by the cover at the second end 96 of the primary shaft 74. A seal 132 is provided about the shaft 74 for sealing this chamber 130. A connecting groove 131 extends from the chamber 130 to a space at the opposite side of the bearing 98a to equalize the pressure on each side of the bearing.

A passage 134 extends from the chamber 130 through the primary shaft 74 along the axis C1 to a cross-passage 136. The cross-passage 136 leads to a vacuum chamber 138.

The vacuum chamber 138 is defined by the moveable sheave 102 mounted on the primary shaft 74, a wall member 140, a diaphragm 142, and a cover member 144.

As illustrated, the wall member 140 comprises a plate element 146 which is mounted on the primary shaft 74. The plate element 146 extends radially out from the shaft 74 towards the cover member 144. The cover member 144 is mounted to the moveable sheave 102 on its side opposite the fixed sheave 100.

Because the moveable sheave 102 is moveable along the primary shaft 74 with respect to the plate element 146, the diaphragm 142 is provided between the plate element 146 and the cover member 144. The diaphragm 142 is a flexible element arranged to permit relative movement of the moveable sheave 102 with respect to the plate element 146, while at the same time maintaining the chamber 138 air-tight.

The wall member 140 is arranged to rotate with the primary shaft 74 at the same speed as the moveable sheave 102. The plate element 146 includes a boss 148 which extends along the exterior of the primary shaft 74 and which is engaged by a pin 150 on the back-up plate 114. As illustrated, a cut-out 152 is provided in the boss 148 which is aligned with the cross-passage 136 leading through the primary shaft 74, providing a through passage therefrom to the vacuum chamber 138.

A fastener 154 is provided on the side of the plate element 146. This fastener 154 is arranged to maintain the plate element 146 in engagement with the back-up plate 114 as described above. As illustrated, the fastener 154 is a threaded nut which engages threads on the exterior of the primary shaft 74.

Seals 156 are preferably provided between the moveable sheave 102 and primary shaft 74 at their interface to prevent air from flowing between these elements. Similarly, a seal 158 is provided between the moveable sheave 102 and the cover member 144 at the connection of the cover member 144 to the moveable sheave 102.

The backup plate 114 generally divides the chamber 138 into a top portion 160 and a lower or bottom portion 162. In order to facilitate the free flow of air between these portions of the chamber 138, a passage 164 is provided through the plate 114.

The operation of the engine braking system 75 is as follows. When the rider of the vehicle 20 is accelerating or generally operating the vehicle at constant speed, the control 116 is arranged to close the first valve 118 and open the second valve 120. With the valves 118, 120 in these respective positions, air at near atmospheric pressure is transmitted through the lines 126, 124 to the connecting passage 128, passage 134 and into the vacuum chamber 138. The chamber 138 is thus filled with air at or near atmospheric pressure as well.

When the chamber 138 is filled with air, the moveable sheave 102 is permitted to freely move along the shaft 74 from its low speed position to its high speed position, dependent on the speed of the vehicle and engine, as described above.

In the event the rider indicates a desire to slow the vehicle 20 by moving the throttle 66 towards the closed position, the engine braking system 75 is arranged to utilize the reduction in engine speed to slow the vehicle 20. This occurs as follows. First, when the throttle 66 is moved towards its closed position, the sensor 68 sends a signal to the control 116 indicating this event. The control 116 then closes the second valve 120 and thereafter opens the first valve 118.

When the first valve 118 is open with the second valve 120 closed, air at or near atmospheric pressure within the chamber 138 is drawn in the direction of the area of lower pressure in the intake passage 58 downstream of the throttle valve 66. In particular, air flows from the passage 138 through the connecting passages 134, 128 to the passages 124, 122 to the intake passage 58.

The reduced air pressure within the chamber 138 as compared to the pressure outside of the chamber has the effect of drawing the moveable sheave 102 on the primary shaft 74 in the direction of its low speed position. When the sheave 102, and thus the drive pulley 104, is arranged to drive the belt 88 in the low speed position, a reduce drive rate from the engine 42 through the transmission 44 is applied to the front and rear driven wheels 30, 32. In other words, the now reduced speed of the engine 42 is used to slow the wheels 30, 32 thus slowing the vehicle 20 automatically and without the need for the rider to apply a separate brake.

Thus, whether the rider falls off the vehicle 20 or intentionally moves the throttle 66 towards its closed position, the vehicle 20 is automatically slowed.

Several advantages are realized by the construction of the engine brake as described above. First, the check valve 123 prevents the reverse flow of air from the intake passage 58 towards the chamber 138, such as when the pressure in the chamber 138 is low and should the pressure in the intake passage 58 exceed that pressure at some time.

Providing the passage 134 through the primary shaft 74 permits the system 75 to have simple construction. In addition, the connecting passage 128 is provided in the transmission cover 92, also lending to a simplified construction.

The cover member 144 extends inwardly over the diaphragm 142, protecting the diaphragm 142. In particular, grease is generally supplied to provide smooth movement of the centrifugal weight 112 along the surfaces of the sheave 102 and backup plate 114. The cover member 144 diverts grease which may flow downwardly away from the diaphragm 142.

Another advantage of this construction is that the chamber 138 is defined at least partly by the moveable sheave 102 itself. This again results in a simple and cost-efficient arrangement for the system.

In the above-described arrangement, the vacuum apparatus which is used to draw air from the chamber 138 comprise a passage leading to the low pressure intake passage 58 area and a valve 118 for opening and closing this valve. Of course, the vacuum apparatus may constitute any number of other means, such as a vacuum pump or the like.

Further, while the engine brake is arranged so that the vacuum apparatus is utilized when the throttle valve 66 is moved, the vacuum apparatus may be used when other indications of desired engine or vehicle speed reduction occur, such as from an engine speed sensor.

A second embodiment engine brake will be described with reference to FIG. 4. In the description and illustration of this embodiment of the invention, like reference numerals will be used with like or similar parts to those of the previous embodiment, except that an "a" designator has been added to all of the reference numerals of this embodiment.

In general, this embodiment engine braking system 75a is adapted for use with a transmission 44a where the moveable sheave 102a of the drive pulley 82a is positioned to the inside of the fixed sheave 100a (i.e. the moveable sheave 102a is position on the opposite side of the fixed sheave 100a from the transmission cover 92a).

In this transmission arrangement the fixed sheave 100a of the drive pulley 82a is positioned near the second end 96a of the primary shaft 74a where it is rotatably supported by the transmission housing 90a. The moveable sheave 102a is movably mounted on the primary shaft 74a between the fixed sheave 100a and the first end 94a of the shaft 74a which is driven by the crankshaft 48a of the engine 42a.

In its low speed position, the moveable sheave 102a moves upwardly away from the fixed sheave 100a, while in its high speed position the sheave 102a moves downwardly towards the fixed sheave 100a under the force generated by the centrifugal weight 112a positioned between the moveable sheave 102a and a backup plate 114a.

Figure 4:
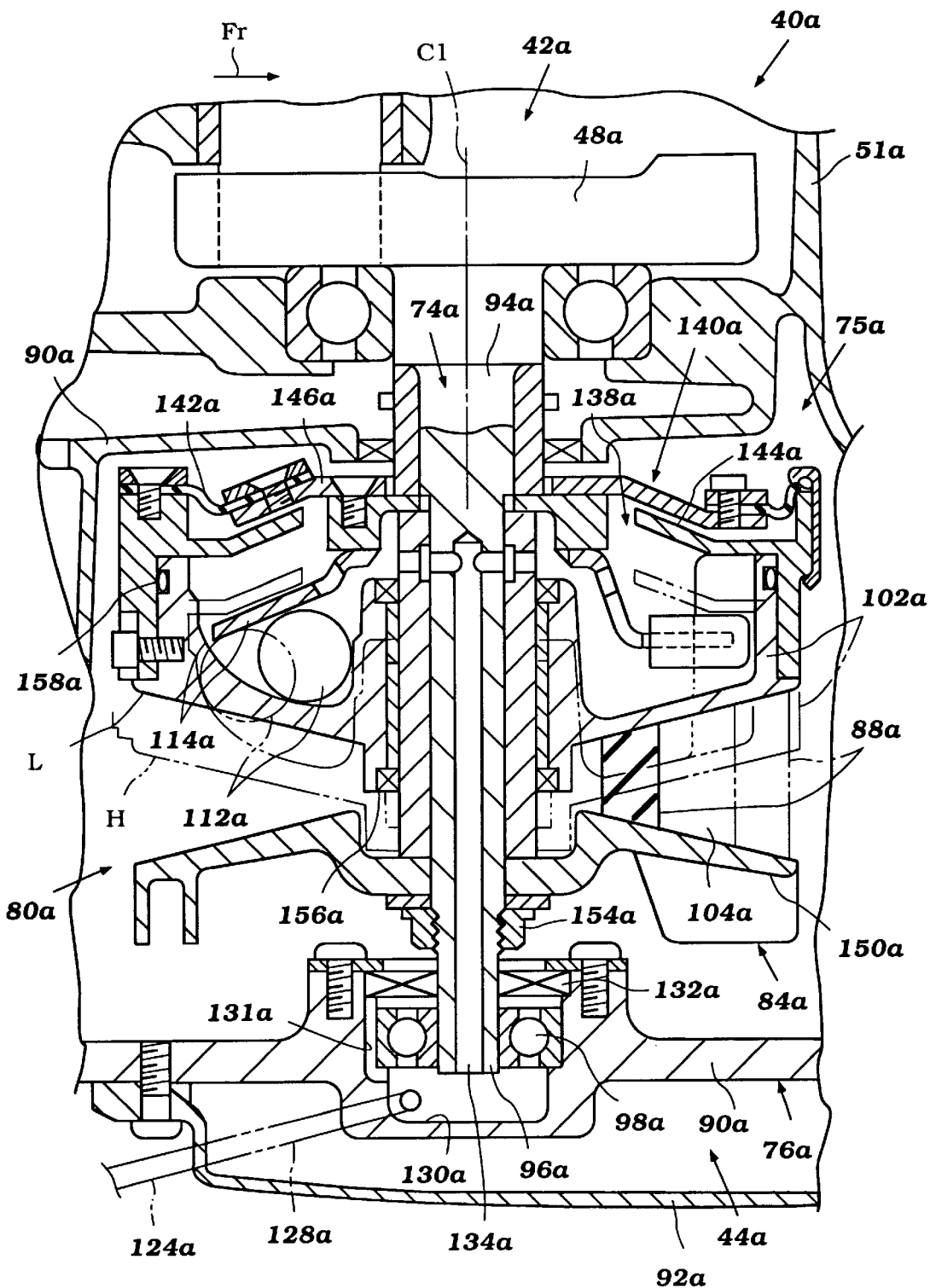
FIG. 4 is a partial cross-sectional view of a transmission including an engine brake for an offroad vehicle in accordance with a second embodiment of the present invention.

As in the first embodiment, the engine braking system 102a includes a control, first and second valves, check valve and passages as illustrated in FIG. 2 and not shown in FIG. 4. The main passage 124a leads to a connecting passage 128a which again extends to a chamber 130a positioned at the second end 96a of the primary shaft 74a.

An elongate passage 134a extends through the primary shaft 74a to connecting passages leading into a vacuum chamber 138a. This chamber 138a is again defined by a dividing wall 140a comprising a plate 146a and diaphragm 142a and a cover member 144a extending between the diaphragm 142a and moveable sheave 102a. In this arrangement, the chamber 138a is positioned above the moveable sheave 102a.

The operation of this embodiment engine braking system 75a is similar to the operation of the embodiment described above. In this embodiment, when the air in the chamber 138a is withdrawn, the moveable sheave 102a is drawn upwardly away from the fixed sheave 100a into its low speed position.

Of course, the foregoing description is that of preferred embodiments of the invention, and various changes and modifications may be made without departing from the spirit and scope of the invention, as defined by the appended claims.

What is claimed is:

1. An offroad vehicle having a frame rollably supported by at least one wheel, an engine supported by said frame and having an output shaft, said output shaft arranged to drive said at least one wheel supporting said vehicle through a transmission, said transmission having a drive pulley driven by said output shaft and a driven pulley driven by said drive pulley, said drive pulley comprising a fixed sheave and a moveable sheave moveable relative to said fixed sheave, said moveable sheave being moveable between a first position and a second position relative to said fixed pulley such that said drive pulley drives said driven pulley in a high speed relationship when said moveable sheave is in said first position and said drive pulley drives said driven pulley in a low speed relationship when said moveable sheave is in said second position, comprising an air chamber and a vacuum apparatus, said air chamber being defined in part by said moveable sheave and said vacuum apparatus removing air from said chamber to reposition said moveable sheave to said second position when a speed of said engine is reduced.

2. The offroad vehicle in accordance with claim 1, wherein said engine includes an intake passage through which air is supplied to said engine, said intake passage having a throttle valve positioned therein for controlling the rate of flow of air through said passage and the speed of said engine and said vacuum apparatus removes air from said chamber when said throttle valve is moved towards a closed position.

3. The offroad vehicle in accordance with claim 2, wherein said engine brake includes a control for controlling said vacuum apparatus based on throttle position as indicated by a throttle position sensor.

4. The offroad vehicle in accordance with claim 2, wherein said vacuum apparatus comprises a vacuum passage leading from said intake passage to said chamber and a valve for opening and closing the vacuum passage.

5. The offroad vehicle in accordance with claim 1, wherein said output shaft drives a primary shaft, said fixed and moveable sheaves mounted on said primary shaft, and wherein said vacuum apparatus includes a passage extending at least partly through said shaft to said chamber.

6. The offroad vehicle in accordance with claim 1, wherein said chamber is defined by a dividing wall connected to said moveable sheave with a diaphragm.

7. The offroad vehicle in accordance with claim 6, wherein said fixed and moveable sheave are mounted to a primary shaft driven by said output shaft and said dividing wall includes a plate connected to said primary shaft and rotated therewith.

8. The offroad vehicle in accordance with claim 1, wherein an atmospheric air passage leads to said chamber from an atmospheric air source through which air is supplied to said chamber at times other than when said vacuum apparatus draws air from said chamber.

9. The offroad vehicle in accordance with claim 8, wherein said engine includes an air box, an intake passage leading from said air box to said engine and a throttle valve position in said intake passage, and wherein said atmospheric air passage leads from said air box to said chamber, and a valve is positioned along said atmospheric air passage for controlling the flow of air therethrough.

10. The offroad vehicle in accordance with claim 4, including a one-way valve position along said vacuum passage preventing the flow of air in the direction of said intake passage towards said chamber.

11. The offroad vehicle in accordance with claim 1, wherein said drive pulley drives said driven pulley with a flexible transmitter.

12. The offroad vehicle in accordance with claim 6, including a cover member extending over at least a portion of said diaphragm.

13. The offroad vehicle in accordance with claim 12, wherein said cover member is connected to said moveable sheave.

14. The offroad vehicle in accordance with claim 5, wherein said primary shaft has a second end opposite a first end driven by said output shaft, a chamber positioned at said second end and said passage through said primary shaft leading to said chamber.

15. The offroad vehicle in accordance with claim 1, wherein said vacuum apparatus includes a passage leading through a housing portion of said transmission in which said drive pulley is mounted.

16. An offroad vehicle having a frame supported by at least one wheel, an engine supported by said frame, said engine having an intake system including an intake passage leading to said engine and a throttle valve movably positioned in said passage for controlling a flow rate of air therethrough, said engine having an output shaft arranged to drive said at least one wheel through a transmission, said transmission comprising a primary shaft driven by said output shaft, a drive pulley mounted on said primary shaft, a driven pulley mounted on a drive shaft, said drive pulley driving said driven pulley with a flexible transmitter, said drive shaft arranged to drive said wheel, said drive pulley comprising a first sheave mounted in a fixed position on said primary shaft and a second sheave movably mounted on said primary shaft, said second sheave moveable between a high speed position and a low speed position, said second sheave in said high speed position being closer to said first sheave than when in said low speed position, an engine brake comprising a vacuum chamber defined at least partly by said moveable sheave, a vacuum passage leading from said chamber to said intake passage downstream of said throttle valve, a control valve being positioned along said vacuum passage being moveable between an open and a closed position, and a control adapted to control movement of said control valve into said open position when said throttle valve is moved towards a closed position, wherein air is drawn from said chamber toward said intake passage through said vacuum passage and said second sheave is moved towards said low speed position.

17. The offroad vehicle in accordance with claim 16, wherein said vacuum passage is at least partially defined through said primary shaft.

18. The offroad vehicle in accordance with claim 16, including an atmospheric air passage leading to said chamber, a second control valve positioned along said atmospheric air passage moveable between an open position and a closed position, and wherein said control is arranged to close said second control valve when said throttle valve is moved towards said closed position.

19. The offroad vehicle in accordance with claim 16, including a throttle position sensor providing throttle position data to said control.

20. The offroad vehicle in accordance with claim 16, wherein said chamber is defined on a side of said second sheave opposite said first sheave.

21. The offroad vehicle in accordance with claim 16, wherein said primary shaft has a first end and a second end, said output shaft driving said first end of said primary shaft wherein said second sheave is positioned between said first sheave and said first end of said primary shaft.

22. The offroad vehicle in accordance with claim 16, wherein said primary shaft has a first end and a second end, said output shaft driving said first end of said primary shaft wherein said second sheave is positioned between said second end of said primary shaft and said first sheave.

23. The offroad vehicle in accordance with claim 16, including at least one seal positioned between said primary shaft and said second sheave.

24. An offroad vehicle having a frame rollably supported by at least one wheel, an engine supported by said frame and having an output shaft, said output shaft arranged to drive said at least one wheel supporting said vehicle through a transmission, said transmission having a drive pulley driven by said output shaft and a driven pulley driven by said drive pulley, said drive pulley comprising a fixed sheave and a moveable sheave moveable relative to said fixed sheave, said moveable sheave in a first position relative to said fixed sheave causing said drive pulley to drive said driven pulley in a high speed position and said moveable sheave in a second position relative to said fixed sheave causing said drive pulley to drive said driven pulley in a low speed position, an engine brake comprising an air chamber defined in part by said moveable sheave and a vacuum apparatus removing air from said chamber and moving said moveable sheave to said second position when a speed of said engine is reduced, wherein said output shaft drives a primary shaft, said fixed and moveable sheaves are mounted on said primary shaft, and wherein said vacuum apparatus includes a passage extending at least partly through said shaft to said chamber.

25. An offroad vehicle having a frame rollably supported by at least one wheel, an engine supported by said frame and having an output shaft, said output shaft arranged to drive said at least one wheel supporting said vehicle through a transmission, said transmission having a drive pulley driven by said output shaft and a driven pulley driven by said drive pulley, said drive pulley comprising a fixed sheave and a moveable sheave moveable relative to said fixed sheave, said moveable sheave in a first position relative to said fixed sheave causing said drive pulley to drive said driven pulley in a high speed position and said moveable sheave in a second position relative to said fixed sheave causing said drive pulley to drive said driven pulley in a low speed position, an engine brake comprising an air chamber defined in part by said moveable sheave and a vacuum apparatus removing air from said chamber and moving said moveable sheave to said second position when a speed of said engine is reduced, wherein an atmospheric air passage leads to said chamber from an atmospheric air source through which air is supplied to said chamber at times other than when said vacuum apparatus draws air from said chamber.

26. The offroad vehicle in accordance with claim 25, wherein said engine includes an air box, an intake passage leading from said air box to said engine and a throttle valve position in said intake passage, and wherein said atmospheric air passage leads from said air box to said chamber, and a valve is positioned along said atmospheric air passage for controlling the flow of air therethrough.

27. An offroad vehicle having a frame rollably supported by at least one wheel, an engine supported by said frame and comprising an output shaft, said engine also comprising an intake passage through which air is supplied to said engine, said intake passage having a throttle valve positioned therein for controlling the rate of flow of air through said passage and the speed of said engine, said output shaft arranged to drive said at least one wheel supporting said vehicle through a transmission, said transmission having a drive pulley driven by said output shaft and a driven pulley driven by said drive pulley, said drive pulley comprising a fixed sheave and a moveable sheave moveable relative to said fixed sheave, said moveable sheave in a first position relative to said fixed sheave causing said drive pulley to drive said driven pulley in a high speed position and said moveable sheave in a second position relative to said fixed sheave causing said drive pulley to drive said driven pulley in a low speed position, an engine brake comprising an air chamber defined in part by said moveable sheave and a vacuum apparatus removing air from said chamber when said throttle valve is moved towards a closed position and moving said moveable sheave to said second position when a speed of said engine is reduced, said vacuum apparatus comprising a vacuum passage leading from said intake passage to said chamber and a valve for opening and closing the vacuum passage, including a one-way valve position along said vacuum passage preventing the flow of air in the direction of said intake passage towards said chamber.

28. The offroad vehicle in accordance with claim 27, wherein said primary shaft has a second end opposite a first end driven by said output shaft, a chamber positioned at said second end and said passage through said primary shaft leading to said chamber.

29. An offroad vehicle having a frame rollably supported by at least one wheel, an engine supported by said frame and having an output shaft, said output shaft arranged to drive said at least one wheel supporting said vehicle through a transmission, said transmission having a drive pulley driven by said output shaft and a driven pulley driven by said drive pulley, said drive pulley comprising a fixed sheave and a moveable sheave moveable relative to said fixed sheave, said moveable sheave in a first position relative to said fixed sheave causing said drive pulley to drive said driven pulley in a high speed position and said moveable sheave in a second position relative to said fixed sheave causing said drive pulley to drive said driven pulley in a low speed position, an engine brake comprising an air chamber defined in part by said moveable sheave and a vacuum apparatus removing air from said chamber and moving said moveable sheave to said second position when a speed of said engine is reduced, wherein said vacuum apparatus includes a passage leading through a housing portion of said transmission in which said drive pulley is mounted.

30. An offroad vehicle having a frame supported by at least one wheel, an engine supported by said frame, said engine having an intake system including an intake passage leading to said engine and a throttle valve movably positioned in said passage for controlling a flow rate of air therethrough, said engine having an output shaft arranged to drive said at least one wheel through a transmission, said transmission comprising a primary shaft driven by said output shaft, a drive pulley mounted on said primary shaft, a driven pulley mounted on a drive shaft, said drive pulley driving said driven pulley with a flexible transmitter, said drive shaft arranged to drive said wheel, said drive pulley comprising a first sheave mounted in a fixed position on said primary shaft and a second sheave movably mounted on said primary shaft, said second sheave moveable between a high speed position and a low speed position, said second sheave in said high speed position being closer to said first sheave than when in said low speed position, an engine brake comprising a vacuum chamber defined at least partly by said moveable sheave, a vacuum passage leading from said chamber to said intake passage downstream of said throttle valve, a control valve being positioned along said vacuum passage being moveable between an open and a closed position, and a control for moving said control valve to said open position when said throttle valve is moved towards a closed position, wherein air is drawn from said chamber into said intake passage and said second sheave is moved towards said low speed position, wherein said vacuum passage is at least partially defined through said primary shaft.

31. An offroad vehicle having a frame supported by at least one wheel, an engine supported by said frame, said engine having an intake system including an intake passage leading to said engine and a throttle valve movably positioned in said passage for controlling a flow rate of air therethrough, said engine having an output shaft arranged to drive said at least one wheel through a transmission, said transmission comprising a primary shaft driven by said output shaft, a drive pulley mounted on said primary shaft, a driven pulley mounted on a drive shaft, said drive pulley driving said driven pulley with a flexible transmitter, said drive shaft arranged to drive said wheel, said drive pulley comprising a first sheave mounted in a fixed position on said primary shaft and a second sheave movably mounted on said primary shaft, said second sheave moveable between a high speed position and a low speed position, said second sheave in said high speed position being closer to said first sheave than when in said low speed position, an engine brake comprising a vacuum chamber defined at least partly by said moveable sheave, a vacuum passage leading from said chamber to said intake passage downstream of said throttle valve, a control valve being positioned along said vacuum passage being moveable between an open and a closed position, and a control for moving said control valve to said open position when said throttle valve is moved towards a closed position wherein air is drawn from said chamber into said intake passage and said second sheave is moved towards said low speed position, and an atmospheric air passage leading to said chamber, a second control valve being positioned along said atmospheric air passage moveable between an open position and a closed position, wherein said control is arranged to close said second control valve when said throttle valve is moved towards said closed position.

* * * * *